(12) United States Patent
Yu

(10) Patent No.: US 7,458,301 B2
(45) Date of Patent: Dec. 2, 2008

(54) WORKTABLE HAVING ADJUSTABLE SHIELD

(76) Inventor: Ben Yu, No. 57, Donyin 13th Road, Taichung (TW) 40147

( * ) Notice: Subject to any disclaimer, the term of this patent is extended or adjusted under 35 U.S.C. 154(b) by 216 days.

(21) Appl. No.: 11/472,859

(22) Filed: Jun. 22, 2006

(65) Prior Publication Data
US 2007/0074612 A1   Apr. 5, 2007

Related U.S. Application Data

(63) Continuation-in-part of application No. 11/243,655, filed on Oct. 4, 2005.

(51) Int. Cl.
*B26D 7/06* (2006.01)

(52) U.S. Cl. ............ 83/102.1; 83/477.2; 83/481; 83/666

(58) Field of Classification Search .............. 83/481, 83/478, 666, 102, 102.1, 477.2
See application file for complete search history.

(56) References Cited

U.S. PATENT DOCUMENTS

| | | | | |
|---|---|---|---|---|
| 741,034 A * | 10/1903 | Hazelton | .............. | 83/477.2 |
| 2,711,762 A * | 6/1955 | Gaskell | .............. | 83/473 |
| 2,956,595 A * | 10/1960 | Warrick et al. | .............. | 144/39 |
| 3,292,212 A * | 12/1966 | Pomper | .............. | 83/675 |
| 3,413,889 A * | 12/1968 | Frank, Sr. | .............. | 407/48 |
| 4,276,799 A * | 7/1981 | Muehling | .............. | 83/473 |
| 4,343,213 A * | 8/1982 | Drixler | .............. | 83/397 |
| 4,418,597 A * | 12/1983 | Krusemark et al. | .............. | 83/478 |
| 4,614,140 A * | 9/1986 | Macksoud | .............. | 83/397 |
| 4,625,604 A * | 12/1986 | Handler et al. | .............. | 83/102.1 |
| 4,721,023 A * | 1/1988 | Bartlett et al. | .............. | 83/100 |
| 4,735,245 A | 4/1988 | Cox | .............. | 144/251 R |
| 4,774,866 A * | 10/1988 | Dehari et al. | .............. | 83/478 |
| 4,901,479 A * | 2/1990 | Helm | .............. | 451/342 |
| 5,065,657 A * | 11/1991 | Pfeifer | .............. | 83/703 |
| 5,231,906 A * | 8/1993 | Kogej | .............. | 83/478 |
| 5,383,383 A * | 1/1995 | Garuglieri | .............. | 83/666 |
| 5,842,400 A * | 12/1998 | McIntosh | .............. | 83/477.2 |
| 5,875,698 A * | 3/1999 | Ceroll et al. | .............. | 83/473 |
| 6,109,157 A * | 8/2000 | Talesky | .............. | 83/666 |
| 6,360,798 B1 | 3/2002 | Apolinski | .............. | 144/286.5 |
| 6,389,701 B1 * | 5/2002 | Friedland | .............. | 30/391 |
| 6,453,786 B1 * | 9/2002 | Ceroll et al. | .............. | 83/473 |
| 6,842,988 B2 * | 1/2005 | Johansson | .............. | 30/388 |
| 2004/0011177 A1 * | 1/2004 | Huang | .............. | 83/478 |
| 2005/0155227 A1 * | 7/2005 | Botefuhr et al. | .............. | 30/276 |
| 2006/0260456 A1 * | 11/2006 | Chang | .............. | 83/477.2 |
| 2007/0095185 A1 * | 5/2007 | Chang | .............. | 83/478 |

* cited by examiner

*Primary Examiner*—Kenneth E. Peterson
*Assistant Examiner*—Sean Michalski
(74) *Attorney, Agent, or Firm*—Charles E. Baxley

(57) ABSTRACT

A worktable includes a frame pivotally attached to a housing, a holder pivotally attached to the frame, a saw blade having a spindle rotatably attached to the holder, and a guide member attached to the spindle of the saw blade for guiding the work piece after being cut by the saw blade. A casing is secured to the frame and includes an outlet for coupling to a vacuum device. A follower is pivotally attached to the casing, for adjustably supporting the guide member, to allow the guide member to be adjusted relative to the frame and the housing. A positioning device may be used for positioning the spindle of the saw blade to the holder, to allow the saw blade to be attached to and disengaged from the holder.

5 Claims, 14 Drawing Sheets

WORKTABLE HAVING ADJUSTABLE SHIELD

The present invention is a continuation-in-part of U.S. patent application Ser. No. 11/243,655, filed 4 Oct. 2005, pending.

BACKGROUND OF THE INVENTION

1. Field of the Invention

The present invention relates to a worktable, and more particularly to a worktable having an adjustable shield movable or adjustable relative to the circular blade, according to work pieces of different thickness, for suitably covering or shielding the circular blade, and for preventing cut chips or particles from flying everywhere.

2. Description of the Prior Art

Typical worktables comprise a circular blade rotatably supported in or on a table, and rotated or driven by a motor in order to cut work pieces. While cutting the work pieces, cut chips or particles may be generated and may flying everywhere. For preventing the cut chips or particles from flying everywhere, a fence guard or a shield is provided and engaged onto the circular blade, in order to cover and to shield the circular blade, and to confine the cut chips or particles, and thus to prevent the cut chips or particles from flying everywhere.

For example, U.S. Pat. No. 4,735,245 to Cox discloses one of the typical worktables also comprising a circular blade rotatably supported in or on a table, and a fence guard or a shield attached or engaged onto the circular blade, in order to cover and to shield the circular blade, and to prevent the cut chips or particles from flying everywhere.

Similarly, U.S. Pat. No. 6,360,798 to Apolinski discloses a similar typical worktable also comprising a fence guard or a shield attached to the supporting table, and engaged onto the circular blade, in order to cover and to shield the circular blade, and to prevent the cut chips or particles from flying everywhere.

The fence guard or shield is pivotally attached to the supporting table, and may not be adjusted or moved relative to the circular blade. However, when work pieces of different thicknesses are engaged onto the work table and cut or machined by the circular blade, the fence guard or shield may be tilted or inclined relative to the supporting table and the circular blade, and thus may not suitably cover or shield the circular blade, such that the cut chips or particles may not be completely or suitably confined within the fence guard or shield and may fly everywhere.

In addition, in the typical worktables, the shaft of the circular blade is rotatable relative to the supporting table and may not be stably retained in place such that the circular blade may not be easily attached to or disengaged from the shaft of the circular blade, and such that additional tools or machines are required to be provided to stably retain and position the shaft of the circular blade to the supporting table.

The present invention has arisen to mitigate and/or obviate the afore-described disadvantages of the conventional worktables.

SUMMARY OF THE INVENTION

The primary objective of the present invention is to provide a worktable including an adjustable shield movable or adjustable relative to the circular blade, according to such as the thickness and/or the length of work pieces, for suitably covering or shielding the circular blade, and for preventing cut chips or particles from flying everywhere.

The other objective of the present invention is to provide a worktable including a structure for allowing the circular blade to be easily attached onto or disengaged from the blade support.

The further objective of the present invention is to provide a worktable including a structure for allowing a guide member to be easily attached onto or disengaged from the worktable.

In accordance with one aspect of the invention, there is provided a worktable comprising a housing, a frame pivotally attached to the housing, a holder pivotally attached to the frame, a saw blade including a spindle rotatably attached to the holder for cutting a work piece, a guide member attached to the spindle of the saw blade, for engaging with and for guiding the work piece after being cut by the saw blade, and a positioning device for positioning the spindle of the saw blade to the holder, to allow the saw blade to be attached to and disengaged from the holder.

The frame includes a casing secured thereto and rotated in concert with the frame relative to the housing, the casing includes a chamber formed therein to receive the saw blade.

The casing includes at least one passage formed therein to slidably receive the spindle of the saw blade, and for allowing the spindle of the saw blade to be moved relative to the frame and the casing. The casing includes an outlet formed therein for coupling to a vacuum device.

A follower is further provided and pivotally attached to the casing, and rotatably attached to the spindle of the saw blade, for supporting the guide member. The follower includes a link pivotally coupled thereto and pivotally coupled to the casing, for guiding the follower to move relative to the casing, the casing includes a bar attached thereto, and the follower includes at least one finger extended therefrom and slidably engaged with the bar, for guiding the follower to move relative to the casing.

The positioning device includes a base attached to the follower, and a spring biasing latch slidably attached to the follower and selectively engageable with the spindle for selectively positioning the spindle to the follower. The base includes a conduit formed therein, the latch is slidably received in the conduit of the follower and includes a guide notch formed therein, and a fastener is engaged with the base and slidably engaged into the guide notch of the latch for limiting the latch to move relative to the base.

The latch includes a head and a spring member engaged between the base and the head of the latch for biasing the latch away from the spindle. The spindle of the saw blade includes a swelling provided thereon for selectively engaging with the latch. The swelling of the spindle includes at least one depression formed therein for selectively engaging with the latch.

A quick release lock device is further provided for quickly releasing and locking the guide member to the follower. The follower includes a groove formed therein, the quick release lock device includes a lock member having at least one projection extended therefrom and slidably engaged in the groove of the follower for guiding the lock member to slide and to adjust relative to the follower.

The guide member includes a pathway formed therein, the lock member includes at least one protrusion extended therefrom and slidably engaged in the pathway of the guide member, the lock member includes an anchor member secured thereto and having at least one cavity formed therein, for receiving the protrusion of the lock member, and for preventing the guide member from being rotated relative to the follower.

The follower includes at least one slot formed therein, the quick release lock device includes a board having at least one orifice formed therein for selectively receiving the projection of the lock member and secured to the lock member with at least one fastener which is engaged through at least one slot of the follower, a lock shank engaged through the anchor member and the lock member and secured to the board, and a handle pivotally attached to the lock shank and having a cam member for engaging with the anchor member.

A spring member is engaged between the anchor member and the follower for biasing the anchor member from the guide member, and a gasket is engaged between the anchor member and the cam member of the lock shank for seating the cam member of the lock shank.

A shield is further provided and attached to the guide member, for covering and shielding the saw blade. The shield includes an outlet hose for coupling to a vacuum device, the guide member includes a lock notch formed therein, the shield is pivotally attached to the lock notch of the guide member with a pivot pin.

The frame includes two side panels secured thereto, for pivotally attaching the frame to the housing. The housing includes two side portions each having a curved sliding member provided thereon, and the side panels of the frame each includes a sliding member provided therein, for slidably engaging with the sliding members of the housing, and for pivotally attaching the frame to the housing, one of the side panels includes a sector gear provided thereon, and a handwheel is rotatably attached to the housing with a pivot axle, and a bevel gear attached onto the pivot axle and engaged with the sector gear of the side panel, for adjusting the frame relative to the housing with the handwheel, the holder includes a sector gear provided thereon, and a handwheel is rotatably attached to the side panels with a pivot rod, and a bevel gear attached onto the pivot rod and engaged with the sector gear of the holder, for adjusting the holder relative to the frame with the handwheel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
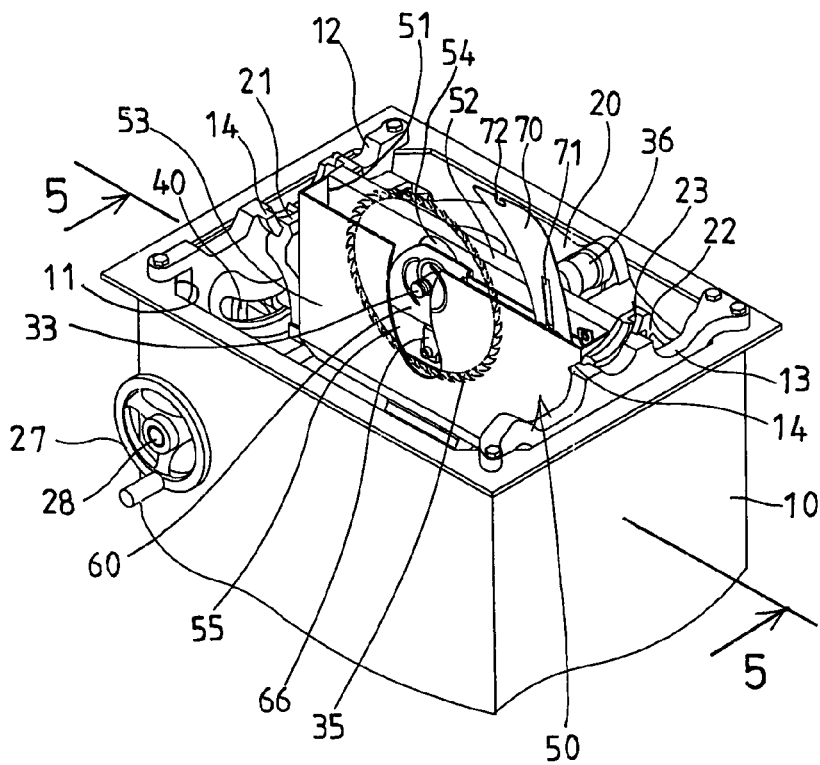
FIG. 1 is a partial perspective view of a worktable in accordance with the present invention.
Figure 2:
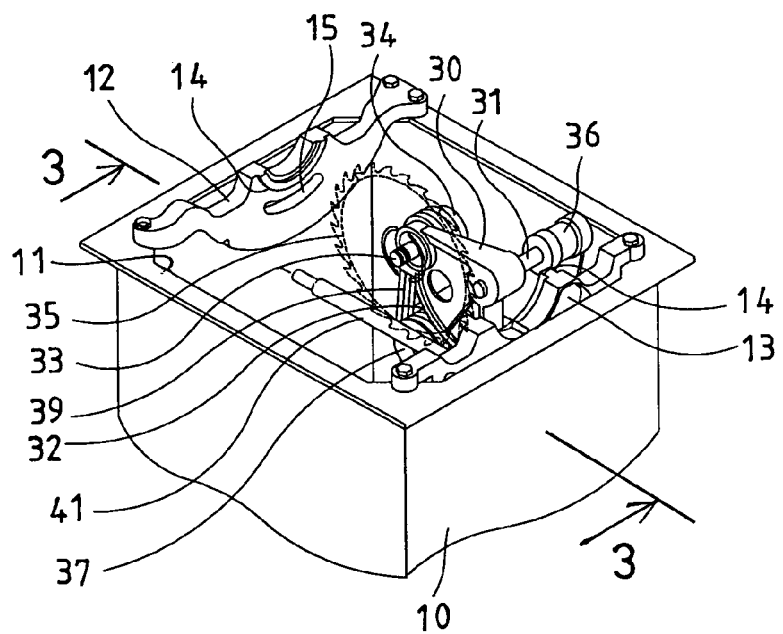
FIG. 2 is another partial perspective view of the worktable.

Referring to the drawings, and initially to FIGS. 1-6, a worktable in accordance with the present invention comprises a table body or a housing 10 including a chamber 11 formed therein, and including two side beams or side portions 12, 13 each having a curved or semi-circular sliding member or rail 14 formed or provided thereon. One of the side beams or side portions 12 of the housing 10 includes a curved slot 15 formed therein, as shown in FIG. 2.

A frame 20 includes two side panels 21, 22 secured thereto, and each having a curved or semi-circular sliding member or channel 23 formed or provided therein, for slidably receiving the corresponding sliding member or rail 14 of the housing 10, and thus for pivotally or rotatably attaching the frame 20 and the side panels 21, 22 to the housing 10. One of the side panels 21 of the frame 20 includes a gear 24, such as a sector gear 24 formed or provided thereon (FIGS. 2-9).

Figure 6:
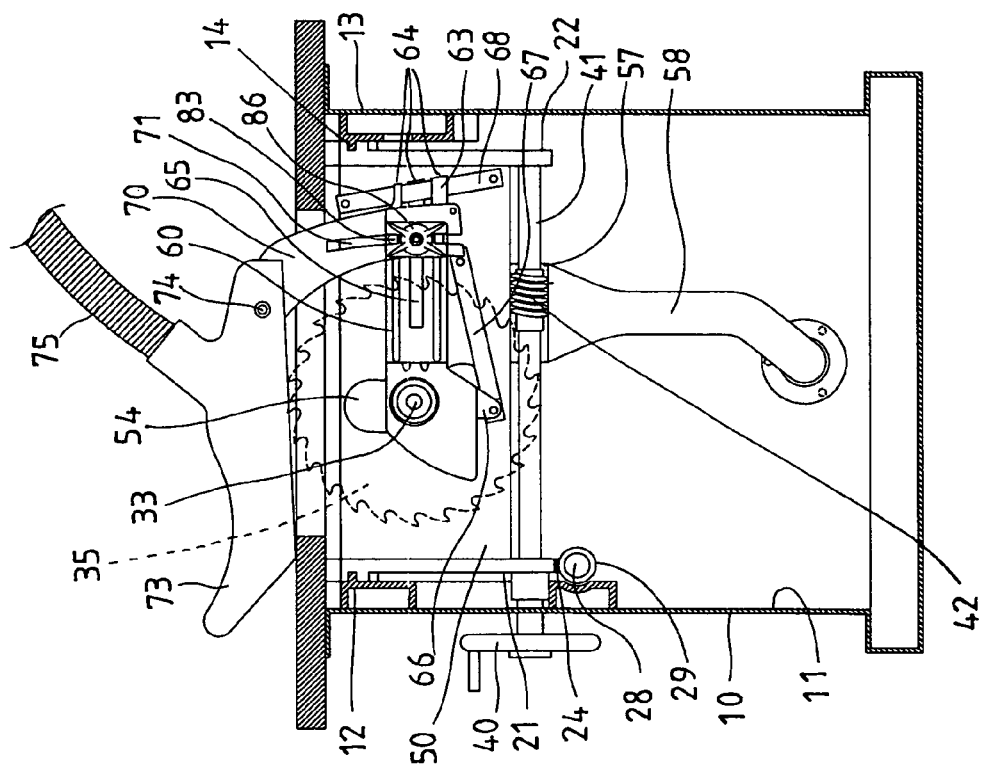
FIG. 6 is a partial cross sectional view similar to FIG. 5, illustrating the operation of the worktable.
Figure 7:
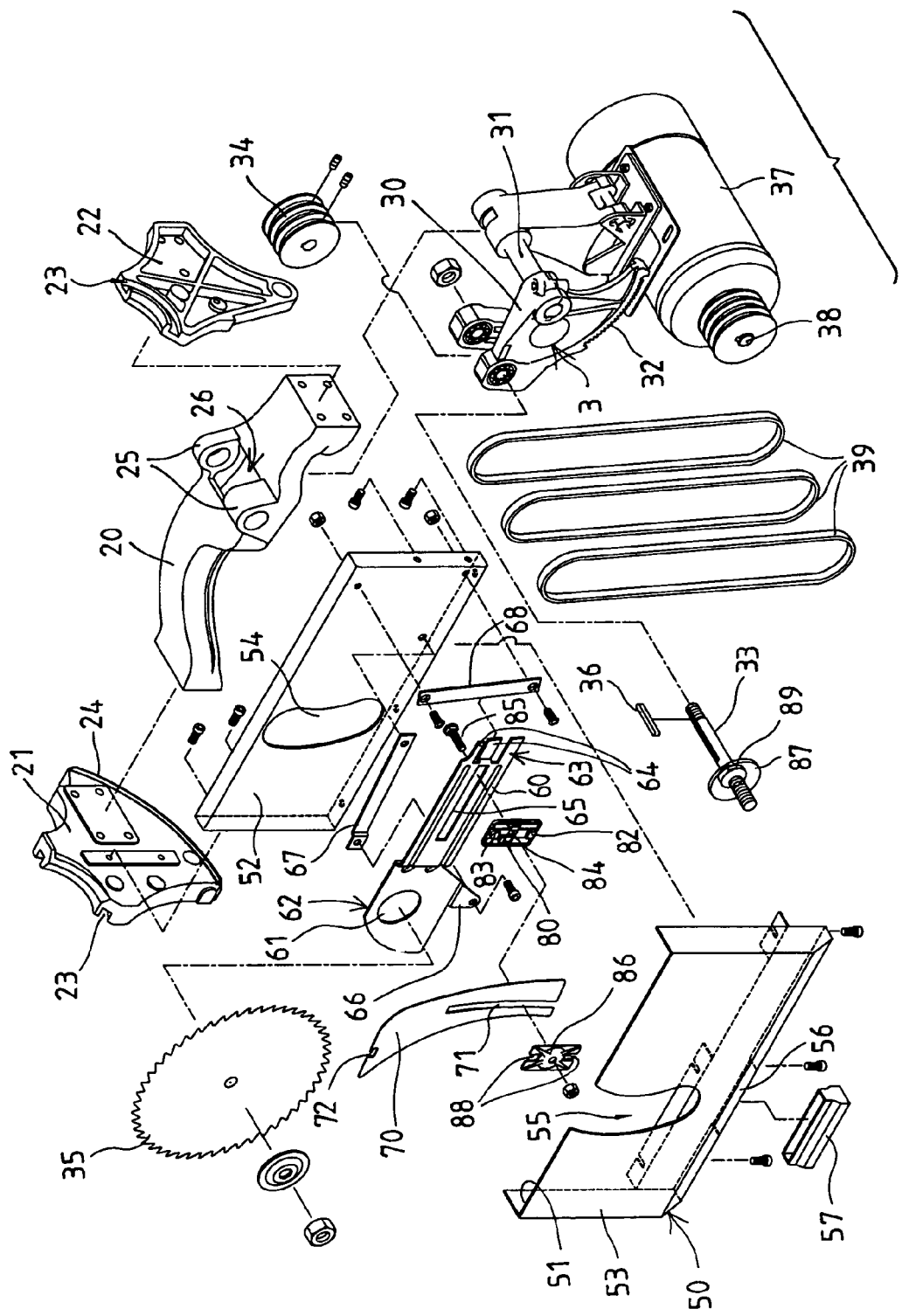
FIG. 7 is a partial exploded view of the worktable.
Figure 8:
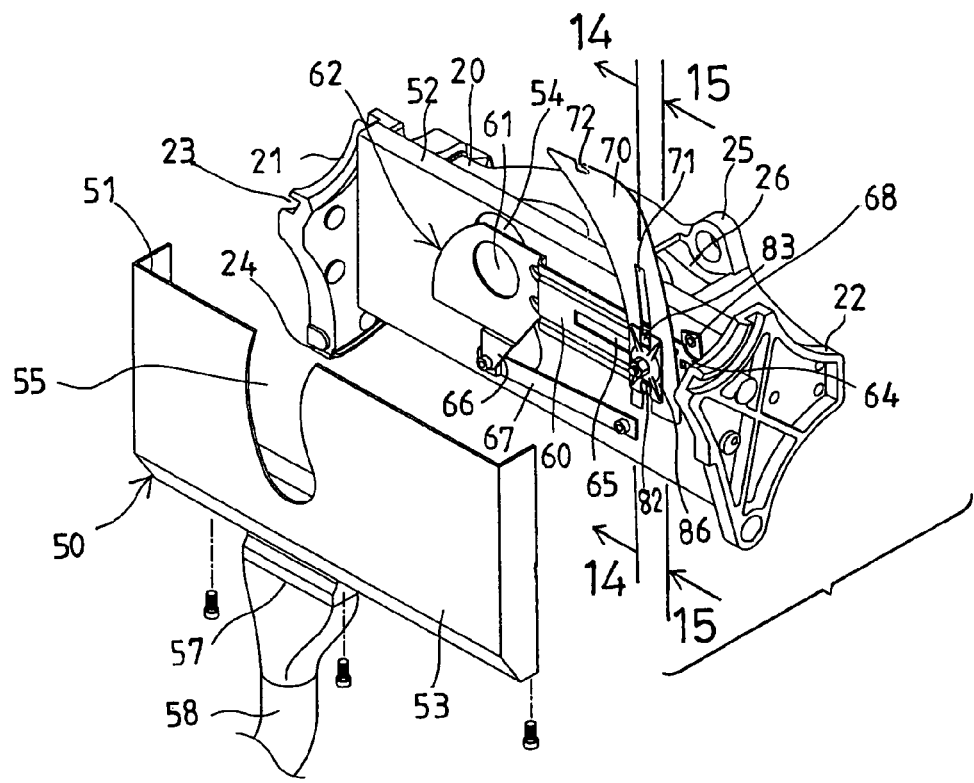
FIG. 8 is another partial exploded view of the worktable.
Figure 9:
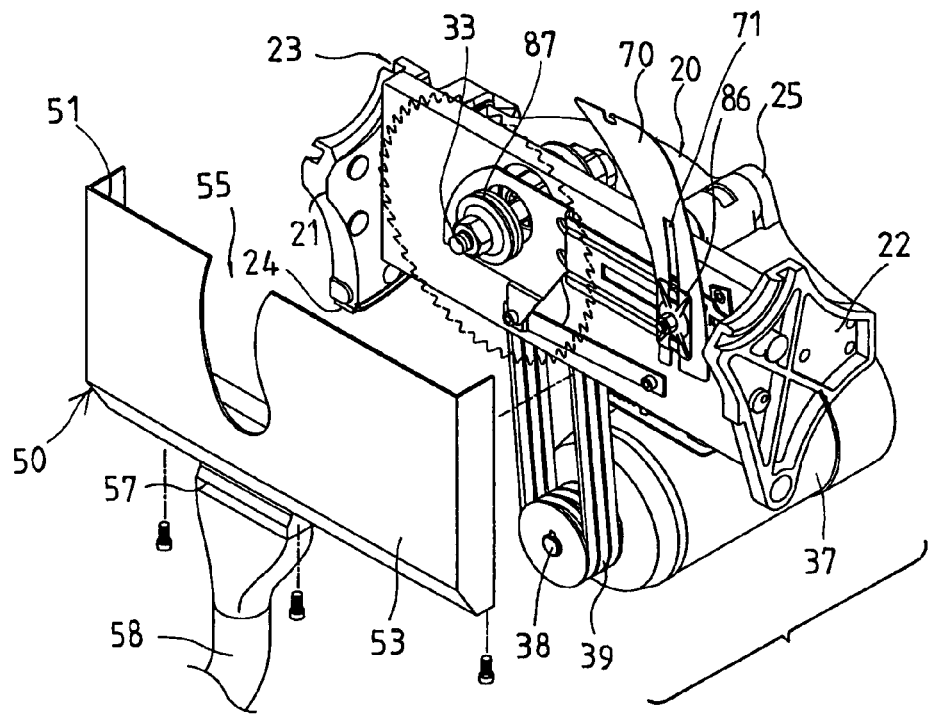
FIG. 9 is a further partial exploded view of the worktable, similar to FIG. 8.

The frame 20 includes two ears 25 extended therefrom and having an opening or space 26 formed or defined between the ears 25 (FIGS. 7-9). A handwheel 27 is rotatably attached to the housing 10 with such as a pivot axle 28 (FIG. 1), and a bevel gear 29 is attached onto the pivot axle 28, and engaged with the sector gear 24 of the side panel 21 of the frame 20 (FIGS. 3-6), to allow the side panels 21, 22 and thus the frame 20 to be rotated and adjusted relative to the housing 10 with the handwheel 27.

As also shown in FIGS. 2-4 and 7, a holder 30 is pivotally or rotatably attached to the frame 20, such as to the ears 25 of the frame 20 with a shaft 31, and includes a gear 32, such as a sector gear 32 formed or provided thereon. A spindle 33 is rotatably attached to the holder 30, and spaced away from the shaft 31, and a pulley 34 and a circular or saw blade 35 are secured to the spindle 33 with such as a key 36 and rotated in concert with the spindle 33. The saw blade 35 may thus to be pivotally or rotatably attached to the frame 20 with the spindle 33 together with the holder 30.

A motor 37 is attached to the shaft 31 of the holder 30 and rotated in concert with the holder 30 (FIGS. 3-4, 7, 9), and the motor 37 includes a spindle 38 coupled to the pulley 34 with a coupling member 39, such as a gear coupling, a sprocket-and-chain coupling member, a belt-and-pulley coupling member 39 or the like, for allowing the spindle 33 and thus the saw blade 35 to be rotated or driven by the motor 37. It is to be noted the motor 37 and the holder 30 and the spindle 33 and the saw blade 35 are all attached to the frame 20, and may be rotated and adjusted relative to the housing 10 with the handwheel 27 altogether.

Figure 4:
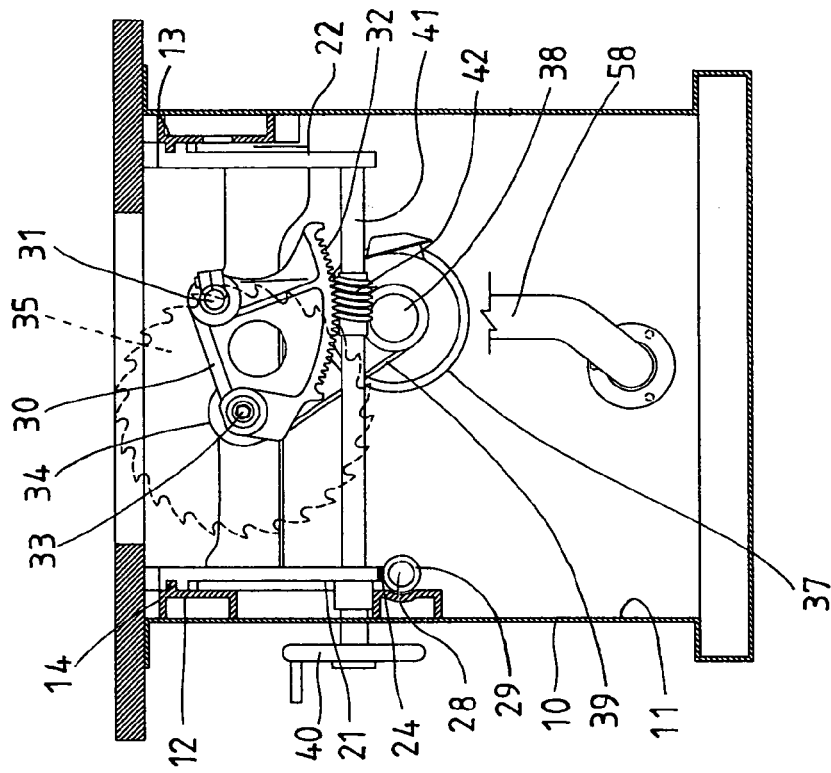
FIG. 4 is a partial cross sectional view similar to FIG. 3, illustrating the operation of the worktable.
Figure 3:
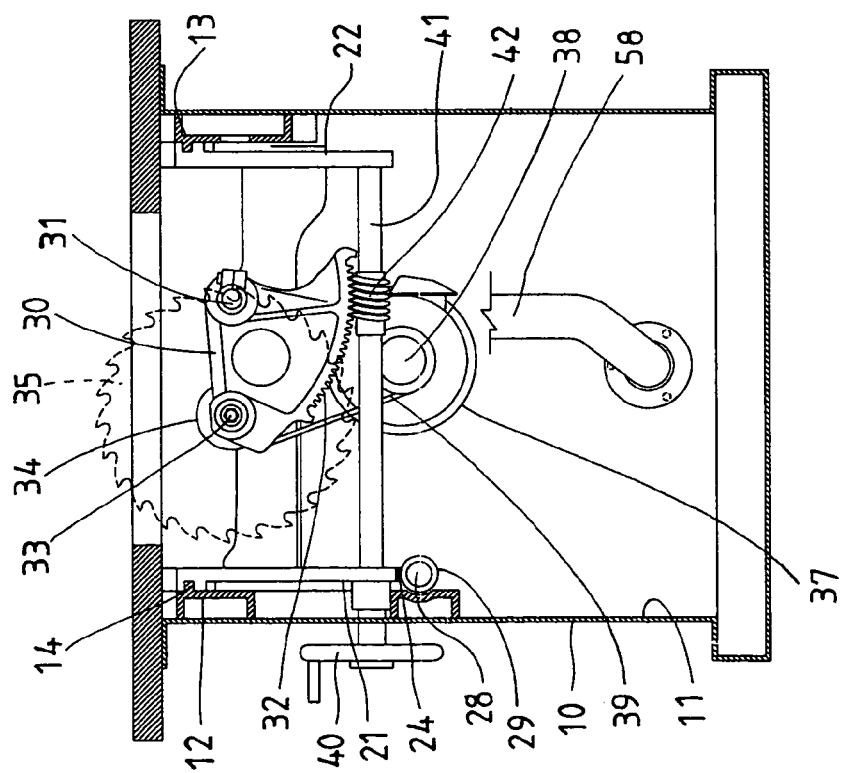
FIG. 3 is a partial cross sectional view of the worktable, taken along lines 3-3 of FIG. 2.

Another handwheel 40 is rotatably attached to the side panels 21, 22 of the frame 20 (FIGS. 3-6), with such as a pivot rod 41, and a bevel gear 42 is attached onto the pivot rod 41, and engaged with the sector gear 32 of the holder 30 (FIGS. 3-4), to allow the holder 30 and thus the saw blade 35 to be rotated and adjusted up and down relative to the frame 20 and/or the housing 10 with the handwheel 40, best shown in FIGS. 3-4. The pivot rod 41 is extended out through the curved slot 15 of the side beams or side portions 12 of the housing 10, and limited to rotate relative to the housing 10 by the curved slot 15 of the side beams or side portions 12 of the housing 10. The above-described structure is typical and will not be described in further details.

As shown in FIGS. 1 and 7-9, a casing 50 is further provided and secured or attached to the frame 20, or the frame 20 includes the casing 50 such as secured between the side panels 21, 22 thereof, to allow the casing 50 to be rotated in concert with the frame 20, relative to the housing 10. The casing 50 includes a chamber 51 formed therein and defined between two plates 52, 53, such as a rear or inner plate 52 and a front or outer plate 53, and the plates 52, 53 each includes a curved passage 54, 55 formed therein, for slidably receiving the spindle 33 of the pulley 34 and the saw blade 35, best shown in FIGS. 1, 5-6 and 10-13.

Figure 5:
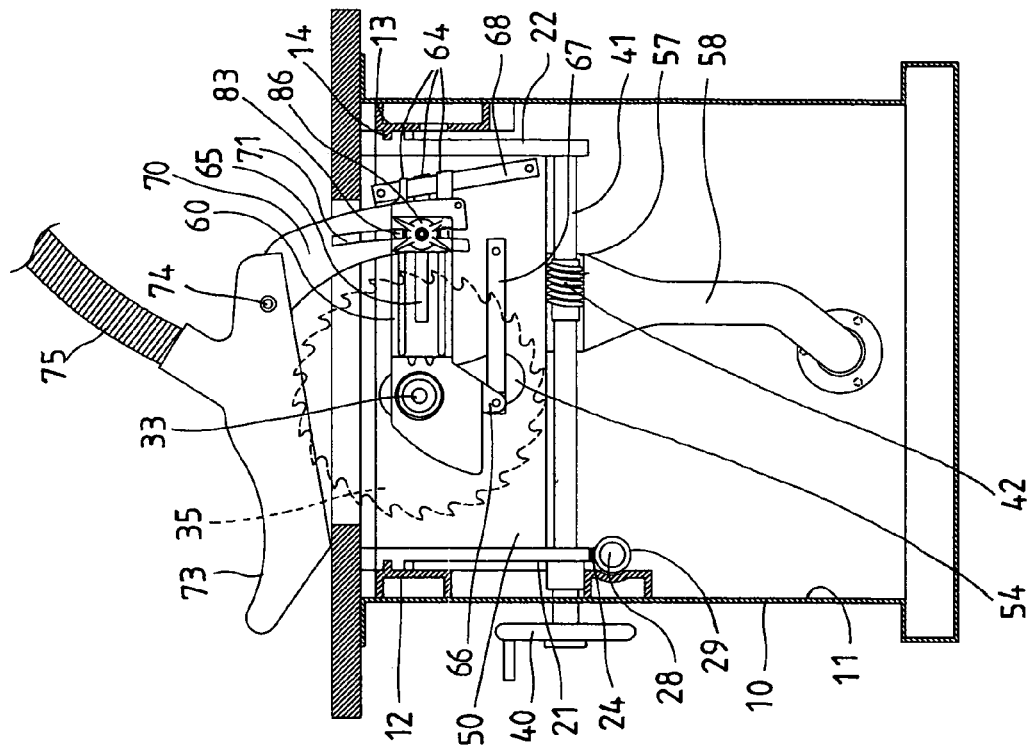
FIG. 5 is a partial cross sectional view of the worktable, taken along lines 5-5 of FIG. 1.

In operation, as shown in FIGS. 1 and 5-6, the circular or saw blade 35 is received within the chamber 51 of the casing 50, and extendible upwardly and outwardly relative to the housing 10 (FIGS. 3, 6), for cutting or machining the work pieces. The casing 50 includes an outlet 56 formed therein (FIG. 7), and a port or nozzle 57 coupled to the outlet 56 thereof, for coupling to a vacuum device or vacuum source via a hose 58 (FIGS. 5-6 and 8-9), in order to draw or to collect the cut chips or particles that may be generated during the cutting operations, and thus to prevent the cut chips or particles from flying everywhere.

A follower 60 includes an orifice 61 formed in one end 62 thereof, and includes the other end 63 having one or more fingers 64 extended therefrom, and includes a groove 65 longitudinally formed in the middle portion thereof, and includes an ear 66 extended from the one end 62 thereof, for pivotally coupling to the housing 10 with such as a link 67, and for guiding the follower 60 to move relative to the housing 10. A bar 68 is secured or attached to the housing 10, and engaged with the fingers 64, for further guiding the follower 60 to move relative to the housing 10, and/or for guiding the follower 60 to move up and down or to move horizontally relative to the housing 10, without being tilted or inclined relative to the housing 10.

A guide member 70 is further provided and to be adjustably attached to the follower 60, and includes a pathway 71 formed therein, and includes a lock notch 72 formed therein, such as formed in the upper portion thereof, for pivotally or rotatably attaching a cover or hood or shield 73 thereto with such as a pivot pin 74 (FIGS. 5-6), and the shield 73 may also be provided to cover or shield the saw blade 35, and may include an outlet hose 75 coupled to a vacuum device or vacuum source, in order to draw or to collect the cut chips or particles that may be generated during the cutting operations, and thus to prevent the cut chips or particles from flying everywhere.

A lock member 80 is further provided and includes one or more projections 81 extended therefrom (FIG. 15), and slidably engaged in the groove 65 of the follower 60, for allowing the lock member 80 to slide or adjust or move relative to the follower 60. The lock member 80 may further include one or more protrusions 82, 83 extended therefrom (FIGS. 7-8 and 14), and slidably engaged in the pathway 71 of the guide member 70, for allowing the guide member 70 to be moved or guided or adjusted up and down relative to the follower 60.

The lock member 80 further includes an aperture 84 formed therein, for receiving a fastener 85 which may be engaged or threaded with an anchor member 86, for selectively or adjustably securing or locking the guide member 70 to the follower 60. The anchor member 86 may include one or more cavities 88 formed therein (FIG. 7), for receiving the protrusions 82, 83 of the lock member 80, and thus for stably securing the guide member 70 to the follower 60, and for preventing the guide member 70 from being rotated relative to the follower 60.

Figure 10:
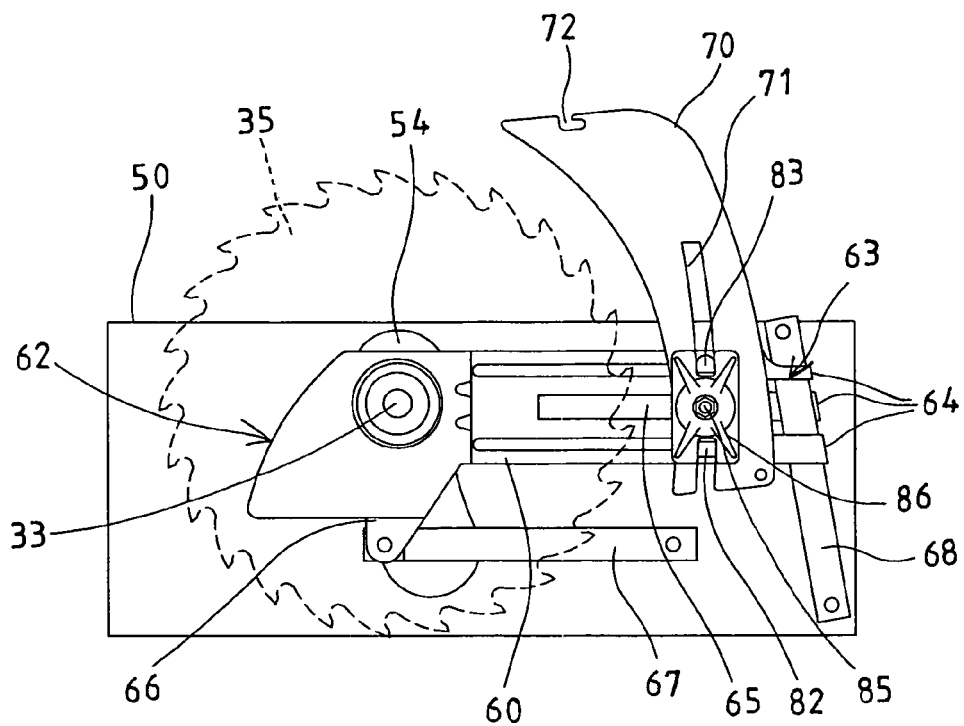
FIG. 10 is a partial plan schematic view of the worktable.
Figure 11:
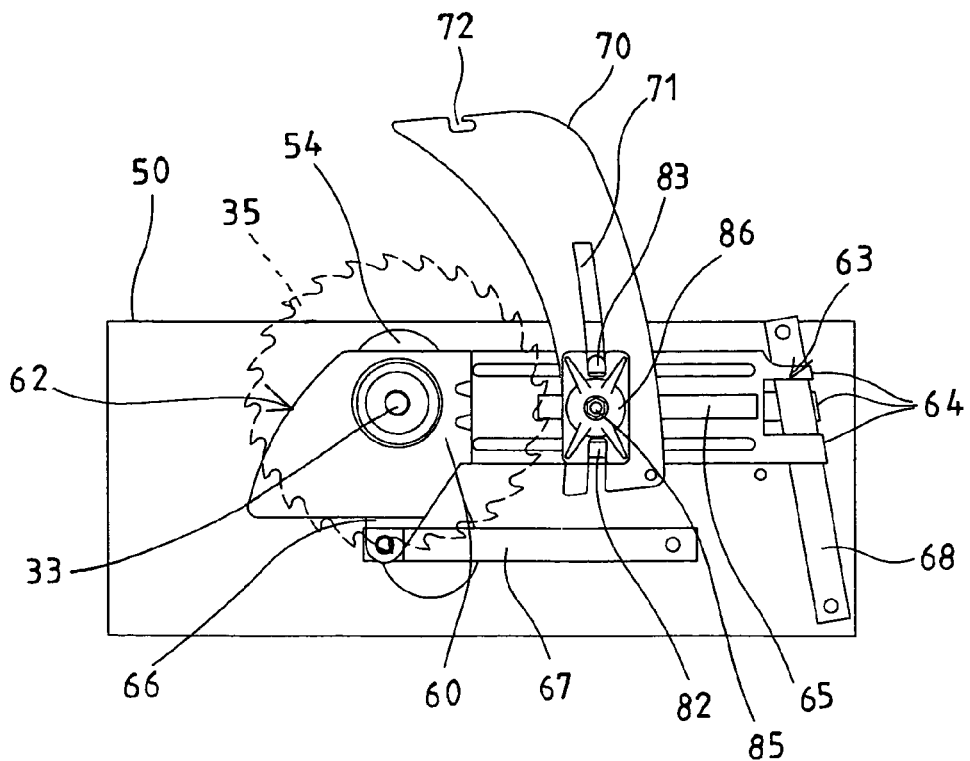
FIGS. 11, 12, 13 are partial plan schematic views similar to FIG. 10, illustrating the operation of the worktable.
Figure 12:
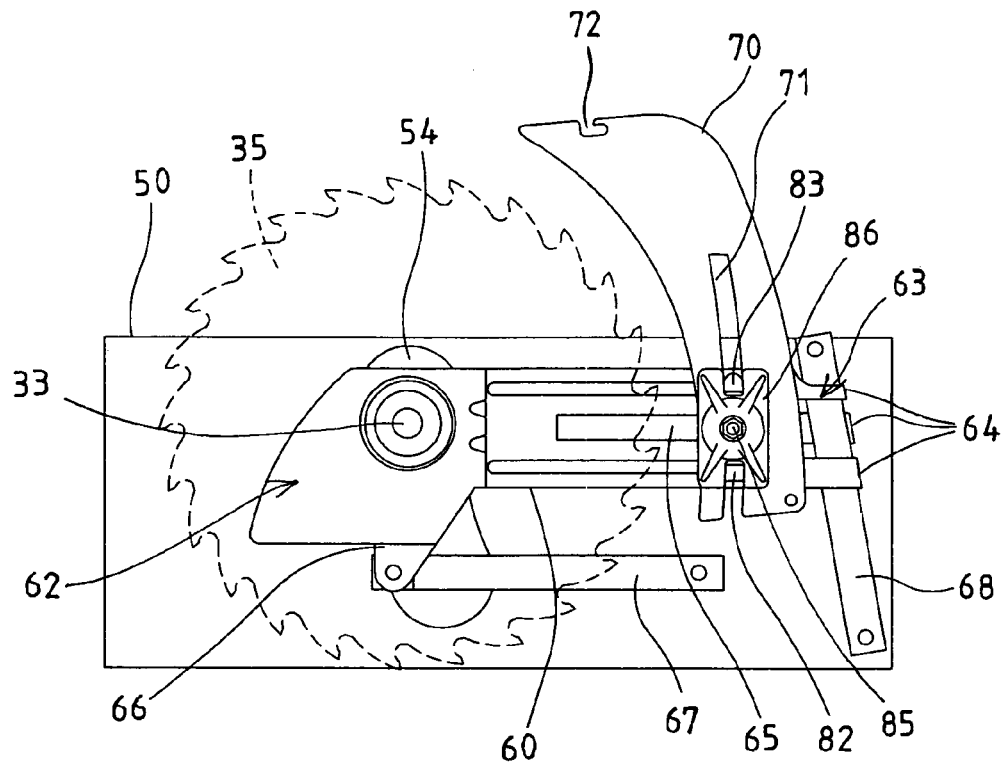
Figure 13:
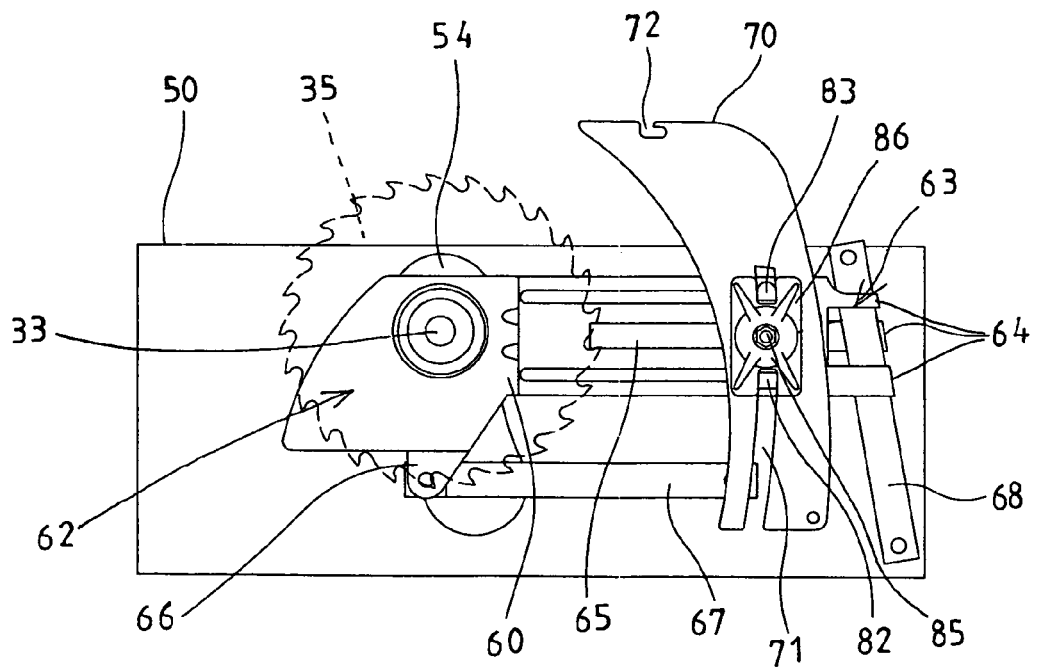
Figure 15:
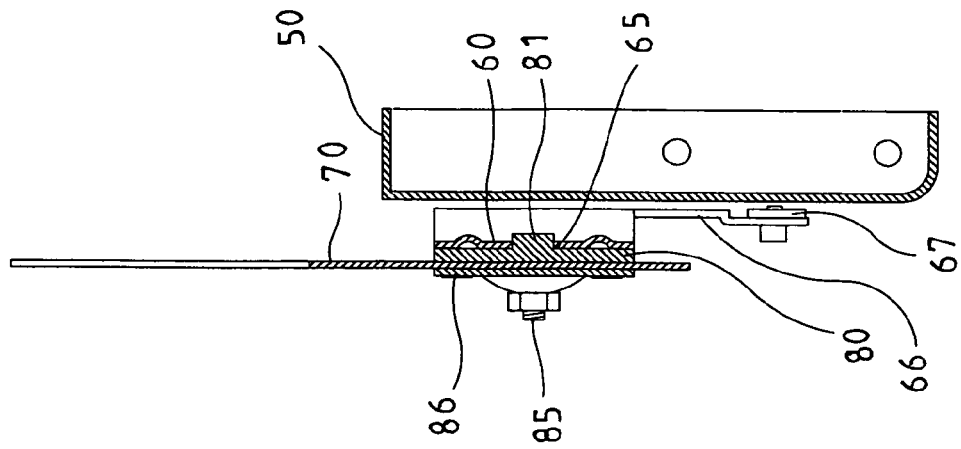
FIGS. 14 and 15 are partial cross sectional views of the worktable, taken along lines 14-14 and 15-15 of FIG. 8 respectively.
Figure 14:
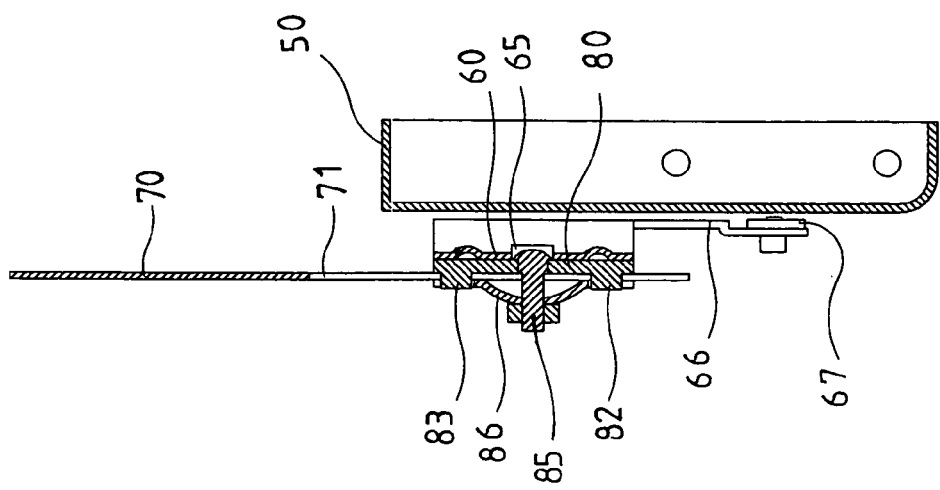

In operation, as shown in FIGS. 10-11 and 15, the projections 81 of the lock member 80 are slidably engaged in the groove 65 of the follower 60, to allow the lock member 80 and thus the guide member 70 to slide or adjust or move relative to the follower 60 and thus relative to the saw blade 35. In addition, as shown in FIGS. 12-13 and 14, the protrusions 82, 83 are slidably engaged in the pathway 71 of the guide member 70, to allow the guide member 70 to be moved or adjusted up and down relative to the follower 60 and thus relative to the saw blade 35.

After or when the work piece is cut by the saw blade 35, the guide member 70 may be provided for engaging with the work piece, and for guiding or separating the two cut pieces of the work piece away from each other, and for allowing the work piece to be suitably cut by the saw blade 35. As shown in FIGS. 5-6, when the guide member 70 is moved or adjusted up and down relative to the follower 60 and the saw blade 35, according to such as the thickness of the work pieces, the shield 73 may also be moved or adjusted up and down relative to the follower 60 and the saw blade 35, for suitably drawing or collecting the cut chips or particles that may be generated during the cutting operations, and thus for preventing the cut chips or particles from flying everywhere.

The follower 60 and the lock member 80 may thus be formed or acted as a securing or attaching means for attaching the guide member 70 and thus the shield 73 to the spindle 33 of the saw blade 35, to allow the guide member 70 and the shield 73 to be moved in concert with the spindle 33 of the saw blade 35. In addition, the guide member 70 and the shield 73 may be adjusted up and down, and away from or closer relative to the follower 60 and the saw blade 35, according to such as the thickness and/or the length of the work pieces, to allow the work piece to be suitably cut by the saw blade 35. The above-described structure has been disclosed in the co-pending U.S. patent application Ser. No. 11/243,655, filed 4 Oct. 2005, which may be taken as a reference for the present invention.

Figure 16:
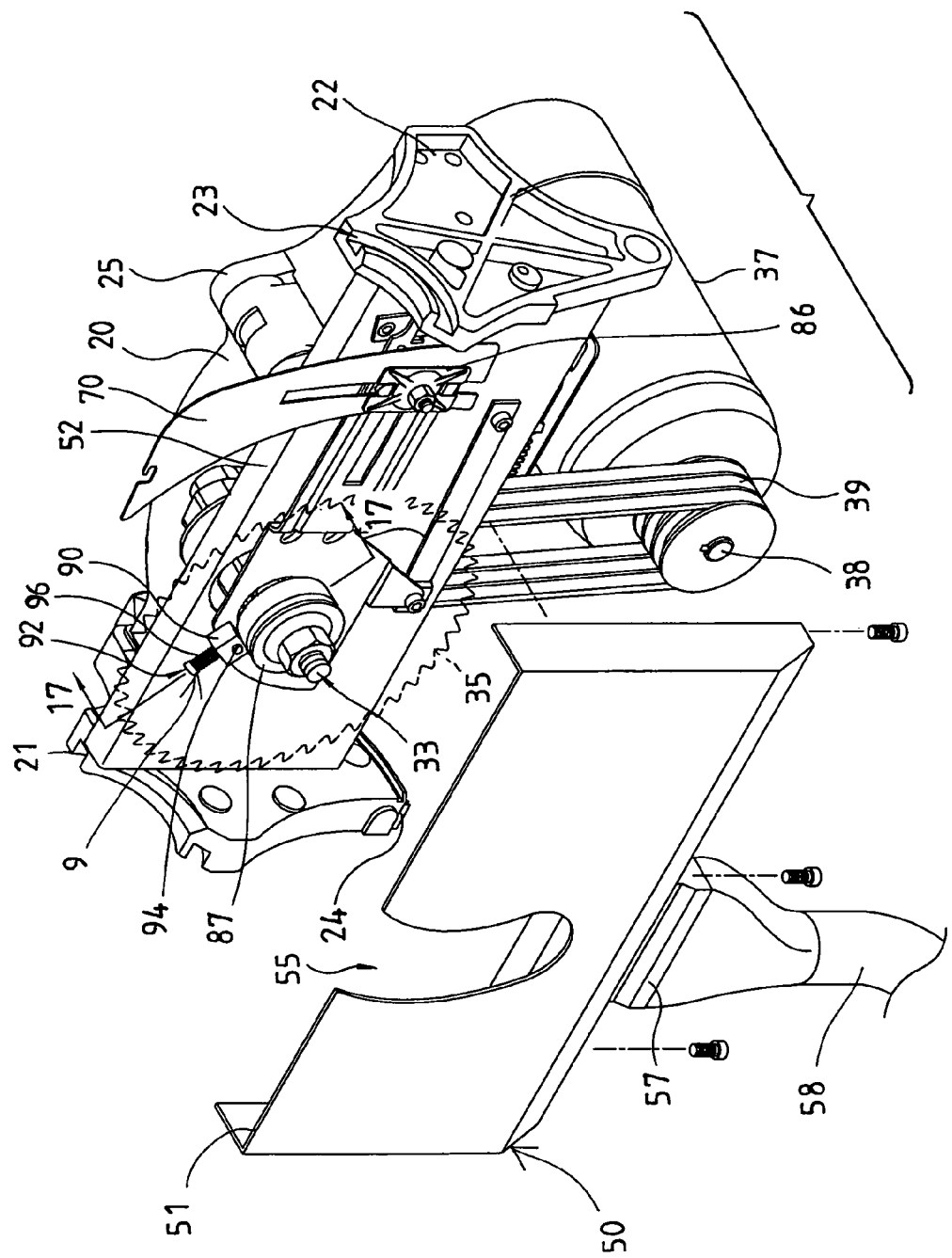
FIG. 16 is a still further partial exploded view similar to FIGS. 8 and 9, illustrating the anchoring or positioning device for positioning or anchoring the spindle of the saw blade to a blade support.
Figure 17:
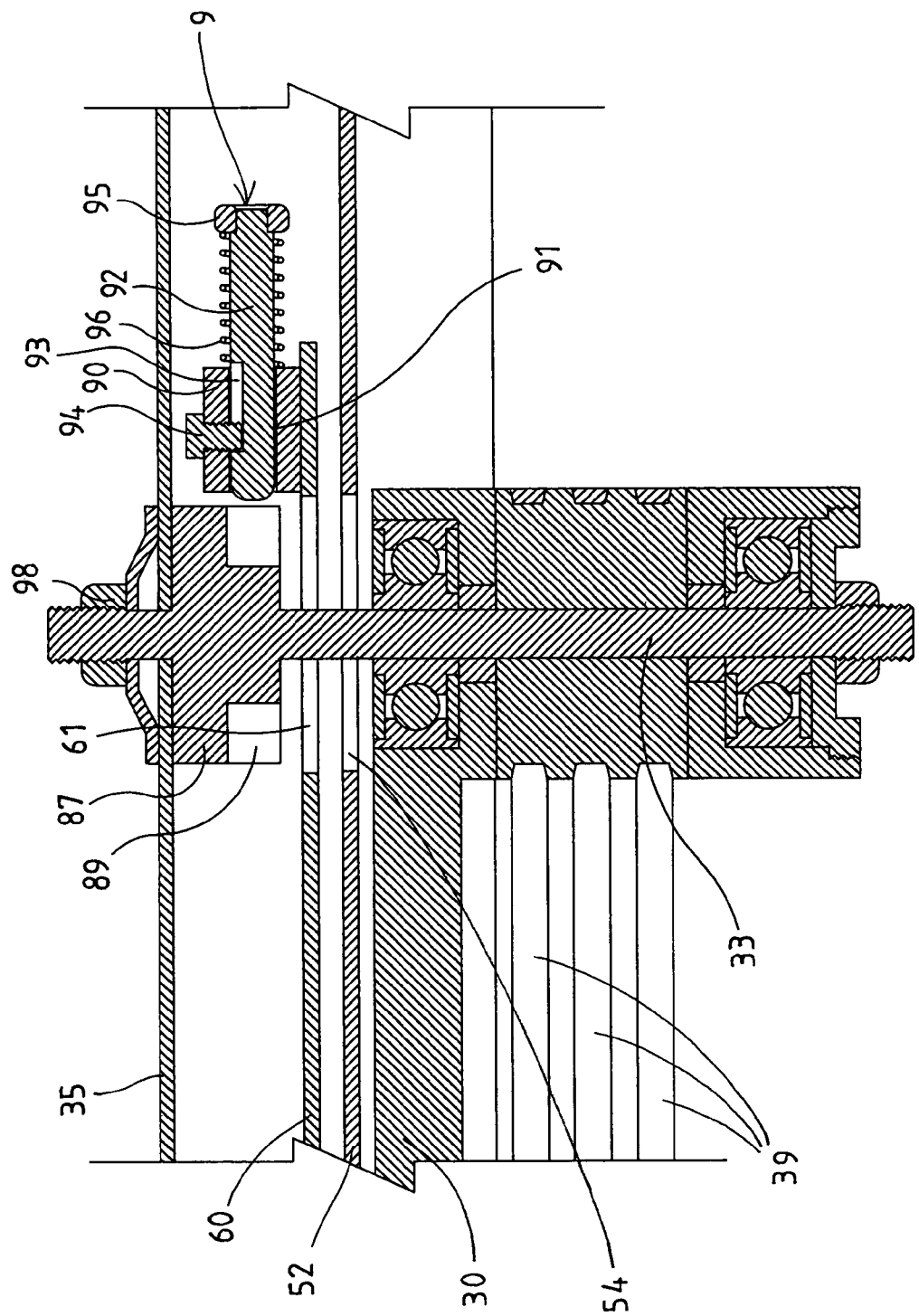
FIG. 17 is a partial cross sectional view of the worktable, taken along lines 17-17 of FIG. 16.

As shown in FIGS. 16-17, the worktable further includes an anchoring or positioning means or device 9 for positioning or anchoring the spindle 33 of the saw blade 35 to a supporting device 3 which includes the follower 60, the holder 30, the frame 20, and the inner plate 52, etc., in which the follower 60 and the inner plate 52 are also indirectly or relatively secured to the holder 30 and the frame 20 and are thus also stably positioned relative to the spindle 33 of the saw blade 35. The spindle 33 of the saw blade 35 includes an enlarged swelling 87 (FIGS. 7, 9, 16-18) formed thereon or attached or secured thereon and having one or more lock depressions 89 formed therein for positioning purposes.

The positioning device 9 includes a base 90 attached or secured to the follower 60 and having a conduit 91 formed therein for slidably receiving a spring biasing latch 92 therein. The latch 92 includes a guide notch 93 formed therein, and a fastener 94 is engaged or threaded with the base 90 and slidably engaged into the guide notch 93 of the latch 92 for limiting the latch 92 to slide or to move relative to the base 90. The latch 92 further includes an enlarged head 95, and a spring member 96 is engaged with the latch 92 and/or engaged between the base 90 and the enlarged head 95 of the latch 92 for biasing the latch 92 away from the swelling 87 of the spindle 33 and for allowing the spindle 33 to be freely rotated relative to the base 90 and the follower 60 and the holder 30 and the inner plate 52 of the supporting device 3.

Figure 18:
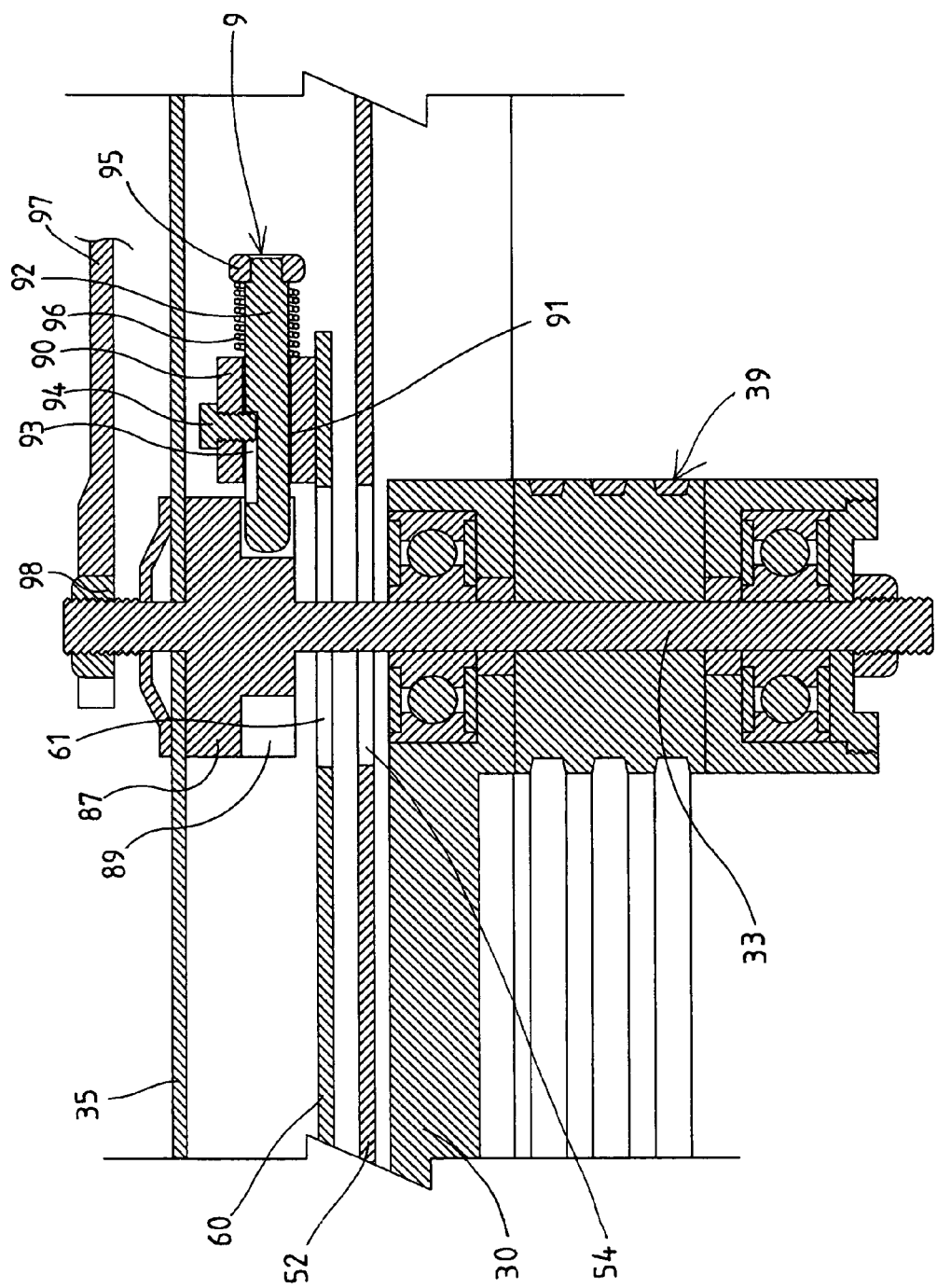
FIG. 18 is a partial cross sectional view similar to FIG. 17, illustrating the operation of the worktable.
Figure 19:
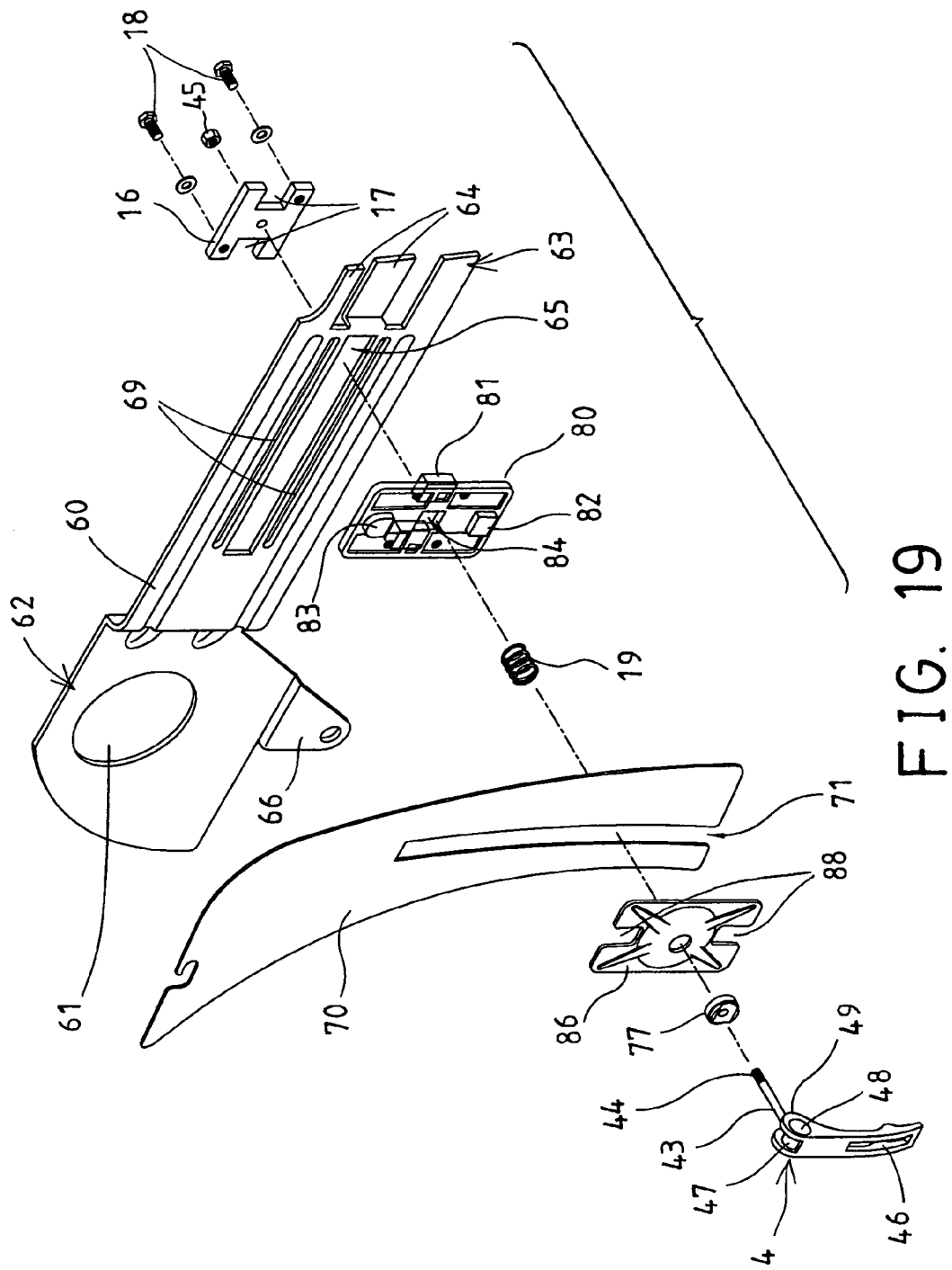
FIG. 19 is a still further partial exploded view illustrating the quick release lock device for detachably locking a guide member to a blade support.
Figure 20:
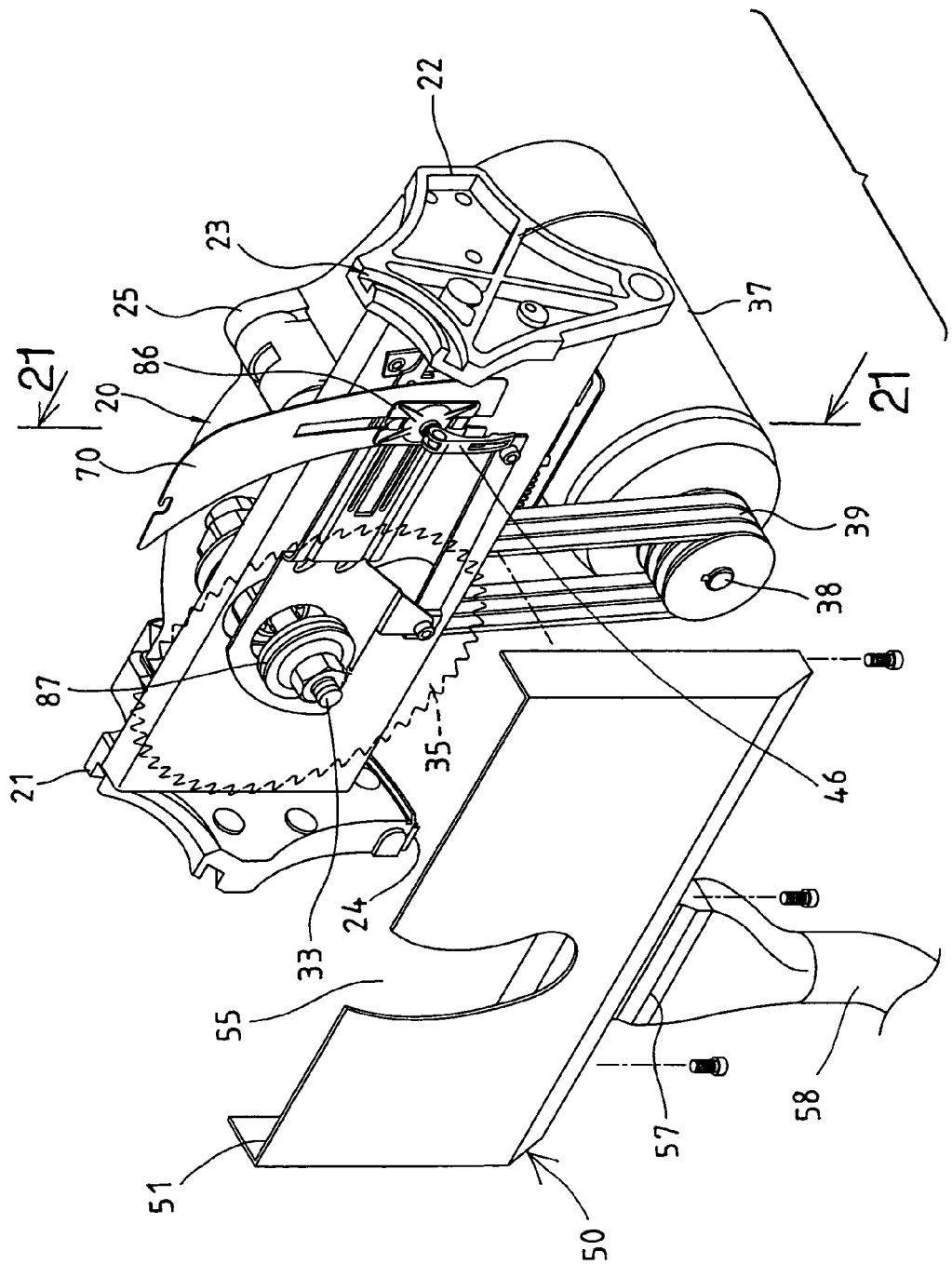
FIG. 20 is a still further partial exploded view illustrating the operation of the quick release lock device.
Figure 22:
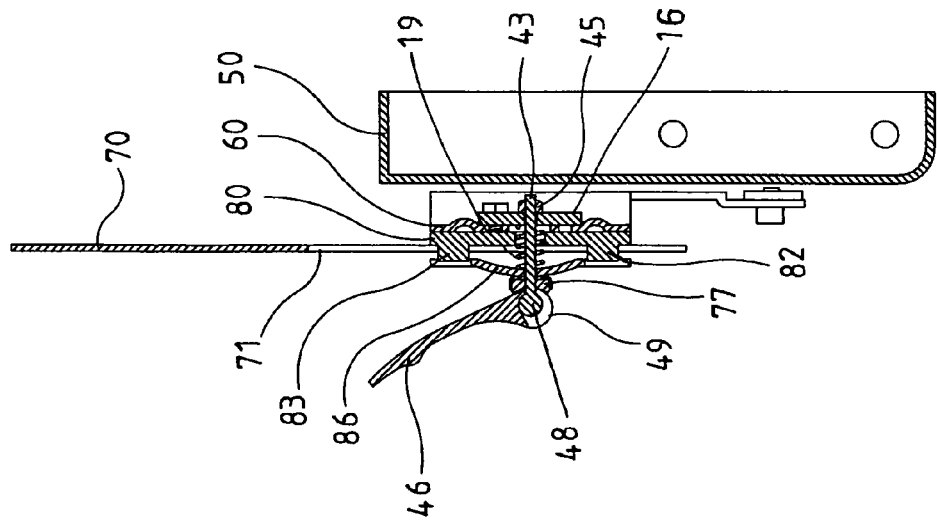
FIG. 22 is a partial cross sectional view similar to FIG. 21, illustrating the operation of the worktable.
Figure 21:
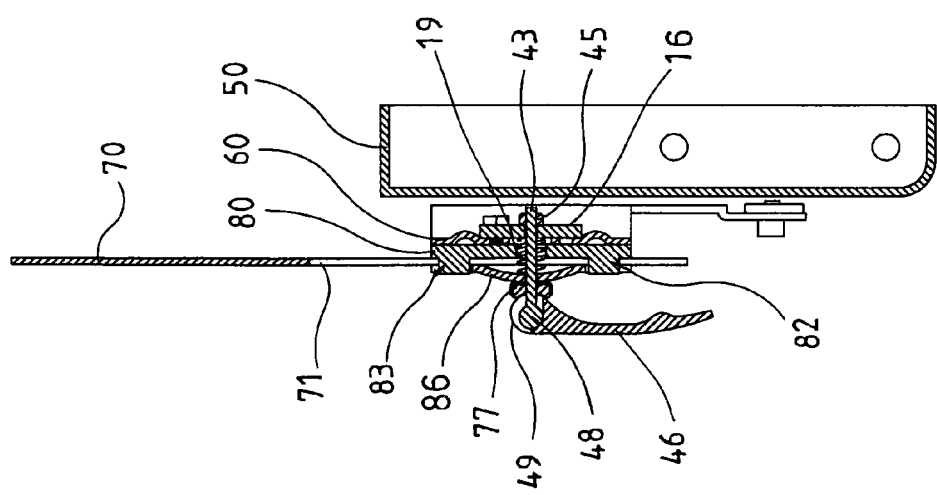
FIG. 21 is a partial cross sectional view of the worktable, taken along lines 21-21 of FIG. 20.

In operation, when it is required to attach or to disengage the saw blade 35 from the spindle 33, as shown in FIG. 18, the latch 92 may be forced to engage into either of the lock depressions 89 of the swelling 87 of the spindle 33 against the spring member 96, in order to lock or to position or to anchor the spindle 33 to the base 90 and the follower 60 and the holder 30 and the inner plate 52 of the supporting device 3, and to prevent the spindle 33 from being rotated relative to the holder 30 of the supporting device 3, such that a wrench or driving tool 97 may be solidly engaged with a lock nut 98 of the spindle 33 for easily attaching or disengaging the saw blade 35 from the spindle 33.

As shown in FIGS. 19-22, the worktable may further include a quick release lock device 4 for quickly releasing or locking the guide member 70 to the follower 60 and for replacing the fastener 85. The quick release lock device 4 includes a board 16 engaged onto or contacted with the follower 60 and having one or more orifices 17 formed therein for selectively receiving the projections 81 of the lock member 80 and secured to the lock member 80 with one or more fasteners 18 which may be engaged through one or more slots 69 (FIG. 19) that are formed in the follower 60, for allowing the anchor member 86 and the lock member 80 and the board 16 to be moved or adjusted sidewise relative to the follower 60.

A lock shank 43 includes one end 44 engaged through the anchor member 86 and the lock member 80 and the board 16 and threaded with a lock nut 45 or directly secured to the board 16, and a handle 46 is pivotally attached to the other end 47 of the lock shank 43 with a pivot pin 48 and includes a cam member 49 provided thereon for engaging with the anchor member 86 and for quickly releasing or locking the guide member 70 to the follower 60. Another spring member 19 is engaged between the anchor member 86 and the follower 60 for biasing or releasing the anchor member 86 from the guide member 70 and for allowing the guide member 70 to be moved or adjusted relative to the anchor member 86. It is preferable that a washer or gasket 77 is engaged onto the lock shank 43 and engaged between the anchor member 86 and the cam member 49 of the lock shank 43 for seating the cam member 49 of the lock shank 43.

In operation, the handle 46 of the quick release lock device 4 may be pivoted or rotated relative to the lock shank 43 about the pivot pin 48 to selectively force the anchor member 86 onto the guide member 70 in order to solidly secure and retain the guide member 70 between the anchor member 86 and the lock member 80, or to selectively release the anchor member 86 from the guide member 70 to allow the guide member 70 to be moved or adjusted relative to the anchor member 86.

Accordingly, the worktable in accordance with the present invention includes an adjustable shield movable or adjustable relative to the circular blade, according to the different thickness or the length of the work pieces, for suitably covering or shielding the circular blade, and for preventing cut chips or particles from flying everywhere, and includes a positioning device for positioning or anchoring the spindle of the saw blade to the follower and the holder and the frame and the inner plate of the supporting device, and includes a quick release lock device for quickly releasing or locking the guide member to the follower.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A worktable comprising:
a housing,
a frame pivotally attached to said housing, and including a casing secured thereto and rotated in concert with said frame relative to said housing, said casing including a chamber formed therein,
a holder pivotally attached to said frame,
a saw blade received in said chamber of said casing and including a spindle rotatably attached to said holder for cutting a work piece,
a guide member attached to said spindle of said saw blade, for engaging with and for guiding the work piece after being cut by said saw blade,
a follower pivotally attached to said casing, and rotatably attached to said spindle of said saw blade, for supporting said guide member,
means for positioning said spindle of said saw blade to said holder, to allow said saw blade to be attached to and disengaged from said holder, said positioning means including a base attached to said follower and having a conduit formed in said base, and a spring biasing latch slidably attached to said follower and slidably received in said conduit of said follower and selectively engageable with said spindle for selectively positioning said spindle to said follower, said latch including a guide notch formed therein, and a fastener engaged with said base and slidably engaged into said guide notch of said latch for limiting said latch to move relative to said base.

2. The worktable as claimed in claim 1 further comprising a shield attached to said guide member, for covering and shielding said saw blade.

3. The worktable as claimed in claim 2, wherein said shield includes an outlet hose for coupling to a vacuum device, said guide member includes a lock notch formed therein, said shield is pivotally attached to said lock notch of said guide member with a pivot pin.

4. The worktable as claimed in claim 1, wherein said frame includes two side panels secured thereto, for pivotally attaching said frame to said housing.

5. The worktable as claimed in claim 4, wherein said housing includes two side portions each having a curved sliding member provided thereon, and said side panels of said frame each includes a sliding member provided therein, for slidably engaging with said sliding members of said housing, and for pivotally attaching said frame to said housing, one of said side panels includes a sector gear provided thereon, and a handwheel is rotatably attached to said housing with a pivot axle, and a bevel gear attached onto said pivot axle and engaged with said sector gear of said side panel, for adjusting said frame relative to said housing with said handwheel, said holder includes a sector gear provided thereon, and a handwheel is rotatably attached to said side panels with a pivot rod, and a bevel gear attached onto said pivot rod and engaged with said sector gear of said holder, for adjusting said holder relative to said frame with said handwheel.

* * * * *